US005542288A

United States Patent [19]
Fenlon

[11] Patent Number: 5,542,288
[45] Date of Patent: Aug. 6, 1996

[54] TESTING OF PACKAGES

[75] Inventor: Christopher Fenlon, Bristol, England

[73] Assignee: Ishida-Nonpareil Limited, Bristol, England

[21] Appl. No.: 295,648

[22] PCT Filed: Feb. 9, 1993

[86] PCT No.: PCT/GB93/00268

§ 371 Date: Nov. 23, 1994

§ 102(e) Date: Nov. 23, 1994

[87] PCT Pub. No.: WO93/17317

PCT Pub. Date: Sep. 2, 1993

[30] Foreign Application Priority Data

Feb. 26, 1992 [GB] United Kingdom ............... 9204137

[51] Int. Cl.$^6$ .................................................. G01M 3/36
[52] U.S. Cl. .................. 73/49.3; 73/52; 73/41; 73/45.4
[58] Field of Search ............... 73/41, 45.4, 49.3, 73/52

[56] References Cited

U.S. PATENT DOCUMENTS

| | | | |
|---|---|---|---|
| 4,148,213 | 4/1979 | Prakken | 73/45.4 |
| 4,649,740 | 3/1987 | Franklin | 73/49.3 |
| 4,671,101 | 6/1987 | Franklin | 73/49.3 |

FOREIGN PATENT DOCUMENTS

| | | | |
|---|---|---|---|
| 238102 | 1/1965 | Austria | 73/41 |
| 62-151735 | 7/1987 | Japan | 73/49.3 |
| 64-79635 | 3/1989 | Japan | 73/45.4 |
| 2162648 | 2/1986 | United Kingdom | 73/49.3 |
| 2234076 | 1/1991 | United Kingdom | 73/49.3 |

OTHER PUBLICATIONS

Japanese Patent Abstracts, vol. 13, No. 540, 5 Dec. 1989 directed to JP 1–223323 of 6 Sep. 1989.

Primary Examiner—Hezron E. Williams
Assistant Examiner—Daniel S. Larkin
Attorney, Agent, or Firm—Larson and Taylor

[57] ABSTRACT

The sealing integrity and/or the proper filling of sealed packages is determined by conveying them continuously along a path and applying loads to them. The loads have package contacting surface portions that travel in the conveying direction, e.g., provided by driven belts or arrays of free-running rollers. Preferably each package is subject to a first load and to a second load greater than the first, and two values related to the effective package thickness under the loads are derived and compared by a computer system. The difference value is indicative of package seal quality.

7 Claims, 1 Drawing Sheet

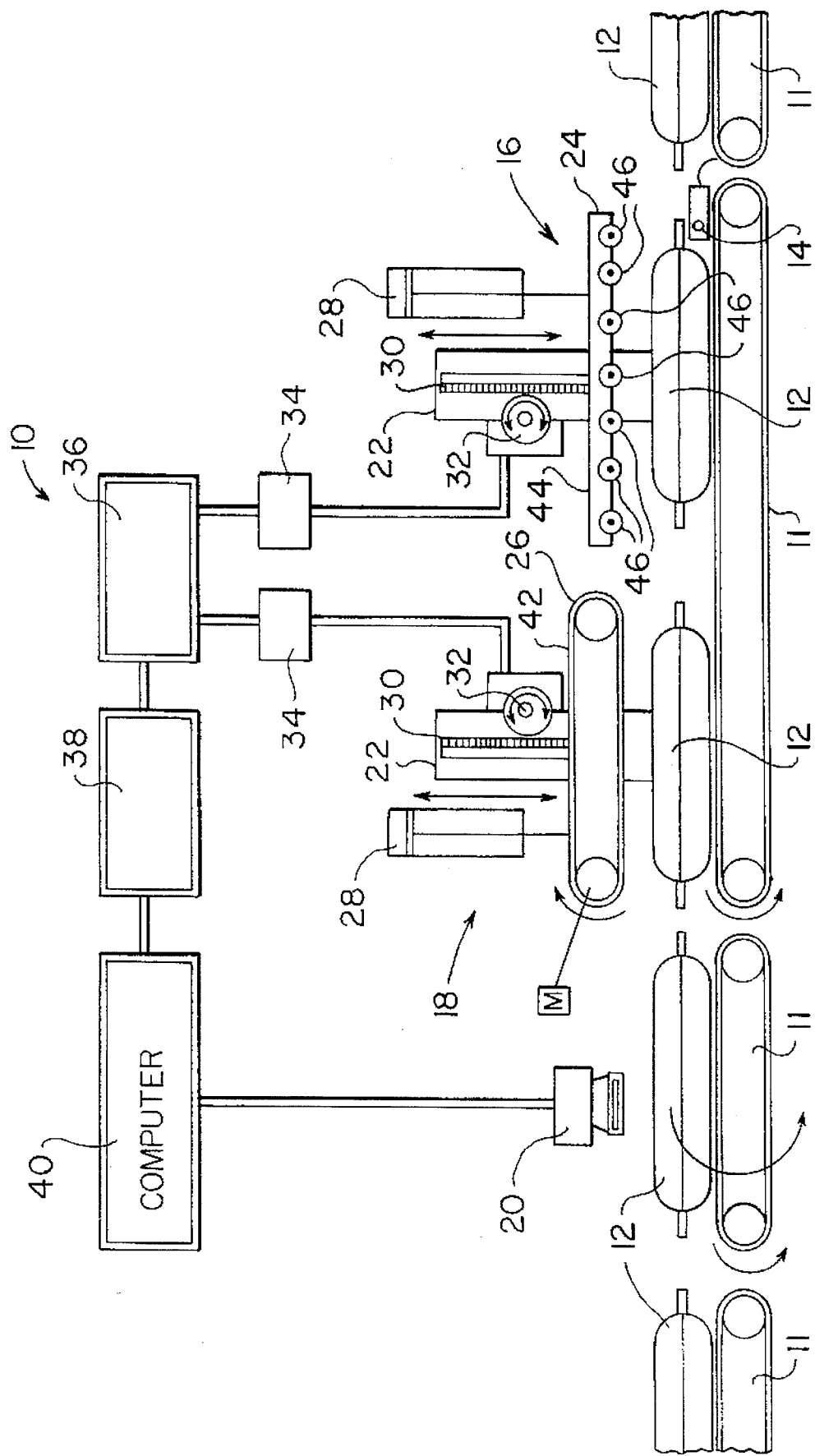

TESTING OF PACKAGES

TECHNICAL FIELD

The present invention relates to a method and apparatus for testing packages, particularly of food stuffs. The testing may be to establish that packages are properly sealed and/or that they are properly filled.

BACKGROUND ART

Known testing equipment tends to be slow and/or unreliable. For example, U.S. Pat. No. 4,649,740 discloses apparatus in which flexible packages are indexed through at least two test stations. At each station, a package stops and a load is applied by probe rods. Two successive stations apply the same load, and the effective thickness of a flexible package is measured in each case. The two thickness measurements are compared, and a difference is deemed to show a defective package. The idea is that a leaky package will be partly deflated at the first station, so that the effective thickness detected at the second station will be less. But we find that this is not reliable. For example, a grossly leaky package will be fully deflated at the first station. The reading at the second station will therefore be the same as at the first, and the package will be accepted as correct. Furthermore, the procedure is slow, owing to its reliance on static testing.

DISCLOSURE OF INVENTION

In one aspect the present invention provides a package testing apparatus having a test station and conveying means for conveying packages along a path extending through the test station, the test station comprising at least one load means, means for effecting relative reciprocation of the or each load means towards and away from the path to apply a load to a package being conveyed along the path and to detect the effect of the load on the package; wherein the or each load means has a package-contacting surface portion that is displaceable in the conveying direction so that a load can be applied to a package while it is being conveyed.

The package-contacting surface portion may be provided by one or more displaceably mounted belts, wheels or rollers. These may be displaceable by contact with packages and/or be driven in synchronism with the conveying means.

The effect of a load on a package may be detected by assessing the resistance of the package when subjected to a load by the load means. This may be done by detecting how far the load means can travel under a predetermined force and/or by detecting the force required to cause a certain amount of travel or a certain degree of deformation of the package. Generally, detection of the travel for a predetermined load is preferred.

Preferably the test station has a plurality of load means spaced along the path. Preferably a first load means for applying a first load is upstream of a second load means for applying a second load greater than the first load; and there are means for providing outputs related to the resistances to said first and second loads, comparing said outputs, and deriving thence a package quality output. With such an arrangement, a grossly leaky package that is fully deflated by the first load means will show a different change in resistance from a sound package; and a slightly leaky package will be different yet again. Thus it is possible to set the apparatus to accept packages having not more than a predetermined degree of leakiness.

The concept of applying a second load that is greater than a first load, and gauging the difference in response, is of wide utility, not restricted to apparatus as defined above, in which there are loads with displaceable package-contacting surface portions. That is, however, preferred. But broadly, the invention provides, in a second aspect, testing apparatus having a test station, and conveying means for conveying packages along a path extending through the test station, wherein the test station comprises first and second load means spaced along The path for applying predetermined loads to packages conveyed along the path, the second (downstream) load means being arranged to apply a greater load than the first load means; said test station further including means for assessing the resistances to the loads applied by the first and second load means respectively (e.g. by providing outputs released to the effective thicknesses of packages subjected to the loads), and means for comparing said resistances to provide an output indicative of package quality. The two load means may have loading elements that are relatively reciprocable towards and away from the path so that packages thereon can be subjected to predetermined loads; and the displacements may be measured to provide said outputs related to the effective thicknesses. Desirably the displacement of the first load means is determined as it is displaced away from the path, and the displacement of the second load means is determined as it moves towards the path. "Package quality" may relate (e.g.) to the leakiness and/or to degrees of filling.

In a third aspect the invention provides a method of testing packages comprising conveying packages along a path and, while they are being conveyed, applying a load to a package via a package-contacting surface portion that is displaceable in the conveying direction and detecting the effect of the load on the package.

In a fourth aspect the invention provides a method of testing packages comprising applying a load to a package, measuring the effect of the load on the package; subsequently applying a greater load to the package and measuring the effect on the package; and comparing the effects of the two loads.

A preferred apparatus embodying the invention is suitable for applying a non-destructive seal test to a sealed packaged product, such as food, drink, chemicals, or medicines, to determine whether the seal of the package is good or bad.

The test is applied to the package after it has been sealed, in order to verify that the seal to each package is good, that the atmosphere or product within the package cannot escape from the package, and that the outside atmosphere cannot enter the package.

However, some packaged products with leaks can still be regarded as acceptable, providing that the leak is below a size specified by the machine user. In these cases the invention can be set to determine that all packages with leaks above a specified size are rejected as bad and that all packages with no leaks or with leaks below a specified size are accepted as good.

Additionally or alternatively, the test could be used to verify that the package has not been overfilled or underfilled with product, atmosphere or gases.

A preferred apparatus may provide a dual test function that can find leaking seals in a wide range of packages, for example, potato crisp bags, even if they have a fluctuating fill volume.

For example, production lines currently producing potato crisps can fill and seal up to 100 packages per minute. However, the volume of atmosphere and of potato crisps in each package may vary from package to package. A preferred embodiment overcomes or ameliorates the problem of variable fill volume by operating a dual comparison. The embodiment can also be set to reject any package that fails to meet a preset acceptable standard or size.

BRIEF DESCRIPTION OF THE DRAWING

In the accompanying drawing, the sole FIGURE is a schematic side view of a package testing apparatus.

MODE FOR CARRYING OUT THE INVENTION

The FIGURE shows a test station 10. A succession of belt conveyors 11 define a conveying path for conveying articles 12 (e.g. bags of potato crisps) through the test station. With intended direction of conveying, articles 12 are carried successively past a sensor 14, a first load applying assembly 16 and a second load applying assembly 18. Subsequently there may be diverter means for diverting from the path articles not to be carried further. This is represented in the FIGURE by a blower 20 that can blow articles laterally off the conveyor 11.

The two load applying assemblies 16, 18 may be of identical construction. They are shown as being different, merely for the sake of illustrating two forms. In each case there is a support 22 on which a load device 24,26 is mounted so as to be vertically reciprocable. A respective actuator 28 is coupled to each device 24,26 for effecting reciprocation and applying a desired downward force. The actuators 28 may be double-acting air cylinders, hydraulic cylinders, or other suitable actuators.

Each load device 24,26 has a scale element 30 that cooperates with a respective incremental encoder 32 for providing an electrical output signal indicative of displacement of the device 24,26. The encoder 32 of the first device 24 is arranged to measure the displacement over an upstroke whereas the encoder 32 of the second device 26 is arranged to measure the displacement over a downstroke. The outputs are fed through respective bidirectional modules 34 to a digital dual input counter 36 which displays the values on a digital display panel.

The data are also relayed to a differential counter 38 and to a computer 40.

The load applying assembly 18 illustrated as the second assembly includes an endless belt 42 which is arranged to be driven in synchronism with the belt conveyor 11 beneath it, but in the opposite rotational sense, so that the upper run of the conveyor 11 and the lower run of the belt 42 which confront each other are driven in the same direction and at the same speed. Thus the belt 42 provides an article-contacting surface portion that can be brought into contact with an article being conveyed without interfering with the conveying thereof.

The load applying assembly 24 illustrated as the first assembly is mechanically simpler. It has a plate 44 to which a multiplicity of light, free-running rollers 46 are mounted so as to be readily rotatable by contact with an article conveyed along the path. (Suitable low back-line pressure chains of rollers are commercially available.) The rollers 46 do not require to be driven. They define a composite article-contacting surface portion.

In each case it will be noted that the article-contacting surface portion is of relatively large extent, which may be slightly greater than the extent of an article 12.

The method of setting the apparatus prior to a production run is as follows:

An optimum or ideal package is selected and is offered up to the first test assembly 16 of the invention, where a reference reading is taken. This reference reading, plus a tolerance band determined by the machine user, is keyed into the input counter 36 (Any package that fails to meet this standard is to be rejected.) During normal operation, articles such as crisp packages 12 are fed continuously, e.g. from an upstream fill and seal machine, via conveyors 11. The arrival of a package at the first test assembly 16 is sensed by sensor 14. This signals computer 40 to operate actuator 28 to apply the first test when the package 12 has arrived centrally under the load applying assembly 24. Actuator 28 pushes the assembly 24 downwards onto the package 12. The amount of pressure used can be preset to suit the type of package being tested.

The distance that the assembly 34 is allowed to travel downwards is determined by the resistance offered by the package being tested. The actual distance travelled is measured on the upstroke by the incremental encoder 32 and fed through the bi-directional module 34 to the digital dual input counter 36 which displays the values on a digital display panel. The data are also relayed to the differential counter 38. The article is conveyed from the first load applying (or test) assembly 16 to and through the second assembly 18. Its arrival there may be detected by a second sensor. But this is not necessary if the computer can compute the time of arrival from the first sensor 14, based on the speed of conveyance and the distance. The second test assembly 18 operates in substantially the same manner as the first, except that the distance of travel is measured on the downstroke. Furthermore the downward force applied by the actuator 28 is set at a higher level.

The encoder 32 feeds a signal representing the displacement through the bi-directional module 34 to the digital dual input counter 36 which displays the reading on its digital display panel. (This may show the readings from the two assemblies 16,18 simultaneously on two displays or successively on one display). The second test reading is also relayed to the differential counter 38, where it is subtracted from the first test reading.

If the difference between the readings is the same as that found for the 'optimum' package on setting up, or is within the tolerance band set, then the package is considered to have good seals and is allowed to continue through to the next in-line machine via an outfeed conveyor 11. If, however, the value is outside the preset tolerance band, the package is considered to have faulty seals, or to be below the standard required for an ideal or optimum pack, and is rejected from the line by the reject mechanism 20.

As well as (or instead of) using the difference value to assess seal quality, the displacement values can be used to indicate whether packages are properly filled. For example, the computer may also be preset with an acceptable range for the displacement of the second load applying device 26. (In this context the first device may serve primarily for causing the package contents to settle down).

I claim:

1. Package testing apparatus having a test station and conveying means for conveying packages along a path extending through the test station, the test station comprising at least one load means, means for effecting relative reciprocation of the load means towards and away from the path to apply a load to a package being conveyed along the path and to detect the effect of the load on the package wherein the load means has a package-contacting surface portion that is displaceable in the conveying direction so that a load can be applied to a package while it is being conveyed; and wherein the package-contacting surface portion is not independently driven and comprises an array of free-running rollers adapted to be displaced by contact with packages being conveyed along the path.

2. Apparatus according to claim 1 wherein the load means is adapted to apply a predetermined load, and further comprising means for measuring the load in terms of the displacement of the load means.

3. Apparatus according to claim 1 wherein the test station has a plurality of said load means spaced along said path.

4. Apparatus according to claim 3 having a first load means for applying a first load upstream of a second load means for applying a second load greater than the first load; means for assessing resistance to the load applied by said first and second loads; means for providing outputs related to the resistances to said first and second loads; means for comparing said outputs; and means for deriving from the comparison a package quality output.

5. Apparatus according to claim 4 wherein the means for assessing resistances to the applied loads comprises means for determining the displacements of the first and second load means.

6. A method of testing packages comprising conveying packages along a path and, while they are being conveyed, applying a load to a package via an array of free-running rollers which are rotated by contact with the moving package; and detecting the effect of the load on the moving package.

7. A method according to claim 6 wherein the step of applying a load to said package comprises: applying a first load to a package being moved along said path; applying a second load greater than said first load to said package at a location along said path which is downstream of the location of application of said first load; assessing resistance to the first and second applied loads; providing outputs related to the assessed resistances; comparing said outputs; and deriving from the comparison of said outputs an indication of package quality.

* * * * *